(12) United States Patent
Gosling et al.

(10) Patent No.: US 12,435,518 B2
(45) Date of Patent: Oct. 7, 2025

(54) MAGNESIUM-OXIDE WALL TILES FOR MODULAR WALL SYSTEMS

(71) Applicant: DIRTT ENVIRONMENTAL SOLUTIONS LTD., Calgary (CA)

(72) Inventors: Geoff William Gosling, Calgary (CA); Hans Gunther Wissner, Calgary (CA); Trevor Samuel Didluck, Calgary (CA)

(73) Assignee: DIRTT ENVIRONMENTAL SOLUTIONS LTD. (CA)

( * ) Notice: Subject to any disclaimer, the term of this patent is extended or adjusted under 35 U.S.C. 154(b) by 912 days.

(21) Appl. No.: 17/286,213

(22) PCT Filed: Jan. 30, 2020

(86) PCT No.: PCT/US2020/015941
§ 371 (c)(1),
(2) Date: Apr. 16, 2021

(87) PCT Pub. No.: WO2020/160309
PCT Pub. Date: Aug. 6, 2020

(65) Prior Publication Data
US 2021/0340772 A1  Nov. 4, 2021

Related U.S. Application Data
(60) Provisional application No. 62/798,969, filed on Jan. 30, 2019.

(51) Int. Cl.
*E04F 13/08* (2006.01)
*B32B 3/04* (2006.01)
(Continued)

(52) U.S. Cl.
CPC .............. *E04F 13/083* (2013.01); *B32B 3/04* (2013.01); *B32B 9/005* (2013.01); *B32B 9/06* (2013.01);
(Continued)

(58) Field of Classification Search
CPC ...... E04F 13/083; E04F 13/0866; E04C 2/28; E04C 2/46
(Continued)

(56) References Cited

U.S. PATENT DOCUMENTS 2,238,289 A * 4/1941 Rippen ..................... B63B 3/68
52/704
2,259,666 A * 10/1941 Small .................. E04F 13/0803
52/762

(Continued)

FOREIGN PATENT DOCUMENTS

AU              600116 B2 *  8/1990  ............. E04C 2/284
CA             2530192 C *   2/2012  ............... B32B 7/12
(Continued)

OTHER PUBLICATIONS

International Preliminary Report on Patentability received for PCT Patent Application No. PCT/US2020/015941, mailed on Aug. 12, 2021, 8 pages.
(Continued)

*Primary Examiner* — Brian D Mattei
*Assistant Examiner* — Joseph J. Sadlon
(74) *Attorney, Agent, or Firm* — Workman Nydegger

(57) ABSTRACT

A magnesium-oxide wall tile for use in a modular wall system includes a plurality of layers. The plurality of layers includes an inner core comprising magnesium-oxide and having a length and a height and a front face and a back face. The plurality of layers also includes a thermofoil layer disposed over at least one face of the inner core.

22 Claims, 5 Drawing Sheets

(51) Int. Cl.
*B32B 9/00* (2006.01)
*B32B 9/06* (2006.01)
*B32B 27/10* (2006.01)
*E04B 2/00* (2006.01)
*E04C 2/28* (2006.01)
*E04C 2/52* (2006.01)

(52) U.S. Cl.
CPC ............... *B32B 27/10* (2013.01); *E04C 2/28* (2013.01); *E04C 2/46* (2013.01); *E04F 13/0866* (2013.01); *B32B 2260/028* (2013.01); *B32B 2260/046* (2013.01); *B32B 2607/00* (2013.01)

(58) Field of Classification Search
USPC .................................................... 52/506.05
See application file for complete search history.

(56) References Cited

U.S. PATENT DOCUMENTS

| | | | | |
|---|---|---|---|---|
| 2,817,131 | A * | 12/1957 | Seegers | E04F 13/0812 24/618 |
| 3,686,805 | A * | 8/1972 | Pofferi | E04F 13/081 52/64 |
| 3,753,827 | A * | 8/1973 | Kober | B32B 13/12 428/443 |
| 4,089,721 | A * | 5/1978 | Sauder | B29C 66/72328 156/212 |
| 4,107,887 | A * | 8/1978 | Wendt | E04B 1/86 52/235 |
| 4,323,615 | A * | 4/1982 | Sauder | B29C 66/45 428/161 |
| 4,337,116 | A * | 6/1982 | Foster | B32B 27/10 428/36.1 |
| 4,356,672 | A * | 11/1982 | Beckman | E04B 2/7448 52/36.6 |
| 4,520,057 | A * | 5/1985 | Fujii | B32B 15/10 428/920 |
| 4,553,366 | A * | 11/1985 | Guerin | E04F 13/0805 52/506.08 |
| 4,607,471 | A * | 8/1986 | Olsen | E04F 13/0803 52/549 |
| 4,866,896 | A * | 9/1989 | Shreiner | E04F 13/0736 52/235 |
| 5,029,425 | A * | 7/1991 | Bogataj | E04F 13/0862 52/510 |
| 5,073,431 | A * | 12/1991 | Martinuzzo | B31F 1/0009 144/381 |
| 5,417,020 | A * | 5/1995 | Dobija | E04F 19/022 52/287.1 |
| 5,475,956 | A * | 12/1995 | Agrawal | B29C 70/72 52/511 |
| 5,592,794 | A * | 1/1997 | Tundaun | E04B 1/6162 52/582.1 |
| 5,624,737 | A * | 4/1997 | Fairbanks | B29C 66/73111 428/537.1 |
| 5,694,727 | A * | 12/1997 | Dobija | E04F 19/06 52/287.1 |
| 5,927,033 | A * | 7/1999 | Kreckl | E04F 13/0883 52/390 |
| 6,006,480 | A * | 12/1999 | Rook | B32B 13/045 52/762 |
| 6,102,172 | A * | 8/2000 | Dercole | A45C 13/262 190/125 |
| 6,226,947 | B1 * | 5/2001 | Bado | E04F 19/06 52/479 |
| 6,460,311 | B1 * | 10/2002 | Ito | E04F 13/0846 52/489.1 |
| 6,754,996 | B2 * | 6/2004 | Komoriya | E04F 13/0885 52/800.1 |
| 6,895,721 | B2 * | 5/2005 | Watanabe | E04F 13/0816 52/476 |
| 7,010,894 | B1 * | 3/2006 | Cappelle | E04F 13/0826 52/489.1 |
| 7,096,629 | B1 * | 8/2006 | Cox | E04F 13/0814 52/489.1 |
| 7,219,475 | B2 * | 5/2007 | Stollenwerk | E04F 13/10 52/510 |
| 7,752,818 | B1 * | 7/2010 | Roegge | E04F 13/0814 52/766 |
| 7,797,902 | B2 * | 9/2010 | Hikai | E04B 1/7637 52/489.1 |
| 7,862,876 | B2 * | 1/2011 | Yuasa | B32B 27/286 428/69 |
| 7,918,065 | B2 * | 4/2011 | Ito | E04F 13/0826 52/489.1 |
| 7,984,593 | B2 * | 7/2011 | Weiser | E04F 13/12 52/235 |
| 8,051,623 | B2 * | 11/2011 | Loyd | E04F 13/0803 52/489.1 |
| 8,196,366 | B2 * | 6/2012 | Thiers | E04F 15/20 52/592.1 |
| 8,528,287 | B2 * | 9/2013 | Aboukhalil | E04F 13/0835 52/506.06 |
| 8,596,007 | B2 * | 12/2013 | Hibbs | E04B 2/7457 403/204 |
| 8,621,810 | B2 * | 1/2014 | Manser | E04F 13/12 52/506.03 |
| 8,652,617 | B2 * | 2/2014 | Riebel | B32B 13/12 428/534 |
| 8,745,941 | B2 * | 6/2014 | Macdonald | E04F 13/0825 52/312 |
| 8,789,331 | B2 * | 7/2014 | Bol | B63B 3/68 52/489.1 |
| 8,984,838 | B2 * | 3/2015 | Bordener | E04B 1/388 52/573.1 |
| 9,016,020 | B1 * | 4/2015 | Yang | E04F 13/0803 52/511 |
| 9,032,682 | B2 * | 5/2015 | Knoll | E04B 2/74 52/239 |
| 9,163,400 | B2 | 10/2015 | Lang | E04B 2/96 |
| 9,297,168 | B2 * | 3/2016 | Kim | E04F 13/0805 |
| 9,328,517 | B2 * | 5/2016 | Bilge | E04F 13/0889 |
| 9,347,225 | B2 * | 5/2016 | Glancy | E04F 13/24 |
| 9,482,004 | B2 * | 11/2016 | Braun | B32B 21/00 |
| 9,551,147 | B2 * | 1/2017 | Marstein | E04C 1/41 |
| 9,562,359 | B1 * | 2/2017 | Grisolia | B32B 3/266 |
| 9,850,666 | B2 * | 12/2017 | Libreiro | E04F 13/0816 |
| 9,926,708 | B1 * | 3/2018 | Janko | E04F 13/0883 |
| 9,957,714 | B2 * | 5/2018 | Carolan | E04C 2/42 |
| 10,066,383 | B1 * | 9/2018 | Perasso | E04B 1/167 |
| 10,343,368 | B2 * | 7/2019 | Riebel | B32B 38/145 |
| 10,343,380 | B2 * | 7/2019 | Curfman | B32B 29/02 |
| 10,391,699 | B2 * | 8/2019 | Roberts | B29C 44/343 |
| 10,435,885 | B2 * | 10/2019 | Piethman | E04B 1/14 |
| 10,465,375 | B2 * | 11/2019 | Fay | E04B 1/8209 |
| 10,472,833 | B2 * | 11/2019 | Loncke | B32B 21/02 |
| 10,526,790 | B1 * | 1/2020 | Ferguson | E04F 13/0814 |
| 10,697,183 | B1 * | 6/2020 | Ferguson | E04B 1/34321 |
| 10,948,799 | B2 * | 3/2021 | Salandre | B32B 1/00 |
| 11,051,613 | B1 * | 7/2021 | Gilbreath | E05B 65/46 |
| 11,161,320 | B2 * | 11/2021 | Karch | B32B 15/14 |
| 11,298,971 | B2 * | 4/2022 | Evangelisti | B44C 5/0461 |
| 11,391,035 | B2 * | 7/2022 | Hammond | E04B 2/58 |
| 11,499,321 | B2 * | 11/2022 | Feys | B41M 1/38 |
| 11,525,268 | B2 * | 12/2022 | De Rick | B32B 27/304 |
| 11,555,309 | B2 * | 1/2023 | Kinnunen | E04C 2/284 |
| 11,794,460 | B2 * | 10/2023 | Vermeulen | B32B 27/40 |
| 2002/0043525 | A1 * | 4/2002 | Laken | B29C 51/02 219/386 |
| 2003/0009973 | A1 * | 1/2003 | Lee | E04F 15/04 52/489.1 |
| 2005/0066608 | A1 * | 3/2005 | Stollenwerk | E04F 13/10 52/506.01 |
| 2005/0255331 | A1 * | 11/2005 | Krebs | B32B 27/32 428/513 |
| 2006/0105661 | A1 * | 5/2006 | Steinbach | B29C 43/22 442/381 |

(56) References Cited

U.S. PATENT DOCUMENTS

| | | | |
|---|---|---|---|
| 2008/0138595 A1* | 6/2008 | Bordener | B32B 27/00 428/220 |
| 2009/0110920 A1* | 4/2009 | Bordener | B32B 5/028 156/60 |
| 2010/0297424 A1* | 11/2010 | Romes | B32B 15/20 427/427.4 |
| 2012/0015107 A1* | 1/2012 | Schacht | E04F 13/08 427/261 |
| 2012/0015176 A1* | 1/2012 | Riebel | B32B 27/36 428/521 |
| 2014/0227509 A1 | 8/2014 | Gillman | |
| 2015/0176287 A1* | 6/2015 | Bilge | E04F 13/12 52/27 |
| 2018/0002924 A1 | 1/2018 | Gosling et al. | |
| 2022/0195135 A1* | 6/2022 | Fuhr | B32B 1/00 |

FOREIGN PATENT DOCUMENTS

| | | | | |
|---|---|---|---|---|
| CA | 2978206 | A1 | 9/2016 | |
| CN | 202509704 | U * | 10/2012 | ............ E04F 13/075 |
| CN | 207620291 | | 7/2018 | |
| CN | 208830626 | | 5/2019 | |
| CN | 109868971 | | 6/2019 | |
| DE | 2613445 | A1 * | 10/1977 | ............ E04F 13/085 |
| DE | 2931223 | A1 * | 2/1981 | ............ B32B 15/046 |
| DE | 19941300 | A1 * | 3/2001 | ............ A47B 96/201 |
| EP | 0032258 | A1 * | 7/1981 | .............. E04F 13/18 |
| EP | 1391569 | A1 * | 2/2004 | .......... E04F 13/0812 |
| EP | 1589158 | A2 * | 10/2005 | .............. E04F 13/08 |
| EP | 2700767 | A2 * | 2/2014 | .............. E04F 13/12 |
| EP | 3034319 | A1 * | 6/2016 | .............. B32B 21/02 |
| FR | 2312622 | A1 * | 12/1976 | ............. B32B 15/20 |
| JP | 02115443 | A * | 4/1990 | |
| JP | 2999493 | B2 * | 1/2000 | ............... B27D 1/00 |
| WO | WO-0151726 | A1 * | 7/2001 | ........... E04B 2/7424 |
| WO | WO-03004795 | A1 * | 1/2003 | .......... E04F 13/0821 |
| WO | WO-03004796 | A1 * | 1/2003 | .......... E04F 13/0826 |
| WO | WO-2004054799 | A1 * | 7/2004 | ............. B32B 15/08 |
| WO | WO-2007090915 | A1 * | 8/2007 | ............ E04F 13/081 |
| WO | WO-2012009528 | A1 * | 1/2012 | ........... A47B 96/206 |
| WO | 2014179868 | | 11/2014 | |
| WO | 2015/188105 | | 12/2015 | |

OTHER PUBLICATIONS

International Search Report and Written Opinion for PCT/US2020/015941 mailed Mar. 31, 2020.

Deslaurier, available at https://www.deslaurier.com/en-us/learning-centre/6-problems-with-thermofoil-kitchen-cabinets, dated Mar. 20, 2023, last accessed Apr. 16, 2024.

CabinetNow, available at https://www.cabinetnow.com/are-thermofoil-cabinets-durable/ (last accessed Apr. 16, 2024).

Wikipedia, available at https://en.wikipedia.org/wiki/Thermofoil, dated Aug. 1, 2022, last accessed Apr. 16, 2024.

Office Action received for Canada Patent Application No. 3124519, mailed on Feb. 27, 2025, 4 pages.

* cited by examiner

MAGNESIUM-OXIDE WALL TILES FOR MODULAR WALL SYSTEMS

CROSS-REFERENCE TO RELATED APPLICATIONS

This application is a 371 US nationalization of PCT Patent Application No. PCT/US2020/015941, filed Jan. 30, 2020, which claims priority to U.S. provisional patent application No. 62/798,969, filed Jan. 30, 2019. The entire content of the aforementioned patent applications is incorporated herein by reference.

BACKGROUND

Technical Field

The present invention relates generally to systems, methods, and apparatus for forming, assembling, and installing architectural tiles. More specifically, the present invention relates to magnesium-oxide wall tiles for use in modular wall systems and methods and processes of manufacturing the same.

Background and Relevant Art

Wall tiles for modular wall systems typically include materials that are durable enough to withstand initial installation and repeated removal and replacement without breaking apart. For example, in a commercial building, business owners may need to reconfigure the partitioning of building space to meet dynamic business needs. Thus, wall tiles in modular wall systems are typically constructed of materials (e.g., wood products, medium-density fiberboard, glass, polymers, etc.) that can withstand being repeatedly removed and/or replaced within a modular wall system to allow for reconfiguration and/or rearrangement of the modular wall system.

Although designers, builders, and/or manufacturers may configure such materials to provide diverse aesthetic features to complement diverse installation spaces, such materials typically fail to provide practical benefits, such as, by way of example and not by way of limitation, fire resistance, pest (e.g., termite, carpenter ant) resistance, moister/mold/mildew resistance, etc.

Magnesium-oxide (MgO) is a refractory material that may be used in high temperature applications such as furnaces, kilns, incinerators, reactors, and the like. In addition, MgO materials may be used in the construction of permanent structures, such as houses, apartments, office buildings, and other buildings. MgO materials may provide various benefits, such as fire resistance and resistance to termites, moisture, mold, and mildew. MgO is also a high-strength material that can be used for structural support.

However, MgO panels and tiles typically include rough, coarse surfaces and therefore may not reflect light in an aesthetically pleasing manner. Accordingly, MgO panels are not well-suited for use in building implementations in which the panels are intended to complement or improve the aesthetic characteristics of the installation space, such as in modular wall systems for subdividing or accenting interior spaces. Generally, builders and manufacturers have found it difficult to apply a wide range of finishes when forming MgO wall panels or tiles. This makes it difficult for manufacturers to produce an aesthetically pleasing and/or customized MgO panel for use in homes and other spaces.

Furthermore, MgO materials tend to chip, crumble (e.g., around edges), and/or otherwise break apart easily with repeated handling over time. The tendency of MgO products to break apart, particularly around edges, is greater for MgO panels that are large in size (e.g., greater than 40 inches in length and/or height). Thus, although conventional MgO products may be suitable for applications in which the MgO product becomes permanently affixed upon initial installation (e.g., in a stick-build home or other structure), MgO products may not be well-suited to accommodate the repeated installation, removal, re-installation, and/or reconfiguration functionality provided by modular wall systems. The tendency for MgO products to break apart also further hinders the aesthetic usability of MgO products in modular wall systems.

Accordingly, there are a number of problems in the field of modular wall systems that can be addressed.

The subject matter claimed herein is not limited to embodiments that solve any disadvantages or that operate only in environments such as those described above. Rather, this background is only provided to illustrate one exemplary technology area where some embodiments described herein may be practiced.

BRIEF SUMMARY

The present disclosure comprises systems, methods, and components for employing magnesium-oxide wall tiles in a modular wall system. For example, at least one embodiment comprises a wall tile having a plurality of layers including an inner core comprising magnesium-oxide. At least another embodiment comprises a modular wall system including a magnesium-oxide wall tile that has an inner core comprising magnesium-oxide. A further embodiment comprises related methods of forming a modular magnesium-oxide wall tile by obtaining an inner core comprising a magnesium-oxide panel. The embodiments disclosed and claimed herein provide an MgO wall tile that provides the advantageous properties of MgO materials while avoiding the conventional, often undesirable, aesthetic appearance associated therewith.

For example, a magnesium-oxide wall tile for use in a modular wall system can include a plurality of layers. The plurality of layers can include an inner core comprising magnesium-oxide and having a length and a height and a front face and a back face. The length and the height can be greater than or equal to 40 inches. The plurality of layers can also include a thermofoil layer disposed over at least one face of the inner core.

In addition, a modular wall system can include a magnesium-oxide wall tile that has an inner core comprising magnesium-oxide, a thermofoil layer disposed over at least one side of the inner core, and an attachment protrusion affixed to a back face of the magnesium-oxide wall tile. The modular wall system can also include a vertical structural component, a horizontal structural component affixed to the vertical structural component, and a connection component configured to engage with the attachment protrusion of the magnesium-oxide wall tile. The connection component is positioned on the horizontal structural component for removably securing the magnesium-oxide wall tile to the horizontal structural component.

Furthermore, a method of forming a modular magnesium-oxide wall tile can include obtaining an inner core comprising a magnesium-oxide panel, cutting the magnesium-oxide panel to a desired length and height (the length and the height each exceed 40 inches), disposing an intermediate layer comprising a smooth resin-impregnated paper on the inner core, and thermoforming a thermofoil layer over at least one side of the inner core, wherein the thermofoil layer is thermoformed at least partially over the intermediate layer.

This summary is provided to introduce a selection of concepts in a simplified form that are further described below in the detailed description. This summary is not intended to identify key features or essential features of the claimed subject matter, nor is it intended to be used as an indication of the scope of the claimed subject matter.

Additional features and advantages of the disclosure will be set forth in the description which follows, and in part will be obvious from the description, or may be learned by the practice of the disclosure. The features and advantages of the disclosure may be realized and obtained by means of the instruments and combinations particularly pointed out in the appended claims. These and other features of the present disclosure will become more fully apparent from the following description and appended claims, or may be learned by the practice of the disclosure as set forth hereinafter.

BRIEF DESCRIPTION OF THE DRAWINGS

In order to describe the manner in which the above recited and other advantages and features of the disclosure can be obtained, a more particular description of the disclosure briefly described above will be rendered by reference to specific embodiments thereof, which are illustrated in the appended drawings. It is appreciated that these drawings depict only typical embodiments of the disclosure and are not therefore to be considered to be limiting of its scope. The disclosure will be described and explained with additional specificity and detail through the use of the accompanying drawings in which.

DETAILED DESCRIPTION

Figure 1A:
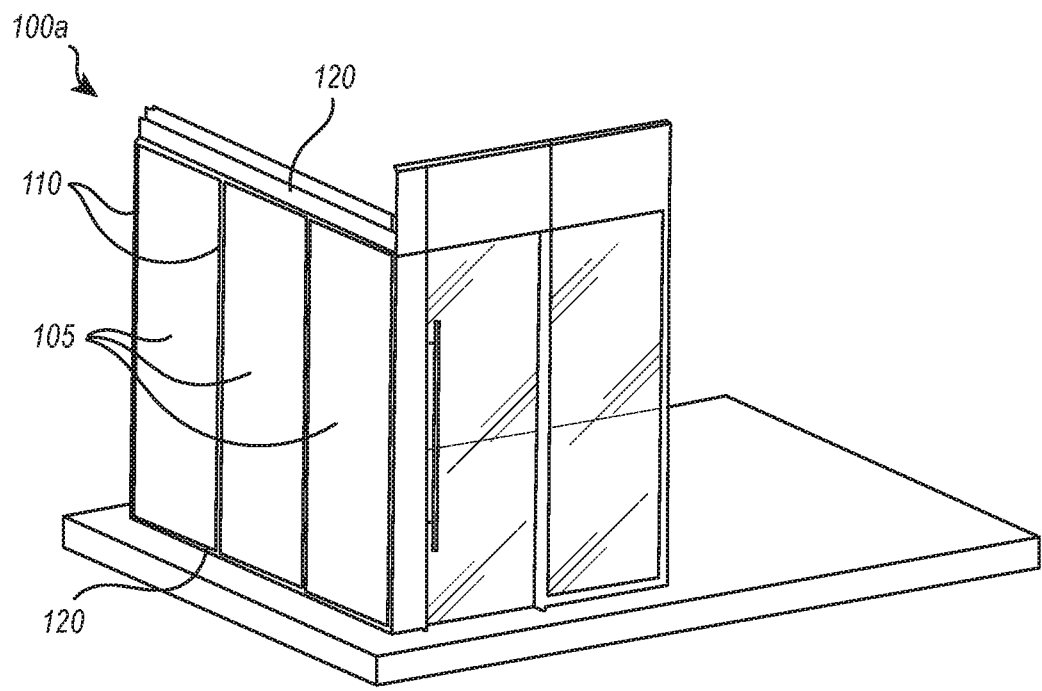
FIGS. 1A and 1B illustrate examples of modular wall systems including a number of modular wall tiles, in accordance with an embodiment of the present invention.

Implementations of the present invention extend to systems, methods, and components for employing magnesium-oxide wall tiles in a modular wall system. For example, at least one embodiment comprises a wall tile having a plurality of layers including an inner core comprising magnesium-oxide. At least another embodiment comprises a modular wall system including a magnesium-oxide wall tile that has an inner core comprising magnesium-oxide. A further embodiment comprises related methods of forming a modular magnesium-oxide wall tile by obtaining an inner core comprising a magnesium-oxide panel. The embodiments disclosed and claimed herein provide an MgO wall tile that provides the advantageous properties of MgO materials while avoiding the conventional, often undesirable, aesthetic appearance associated therewith.

For example, in one implementation of the present disclosure, a magnesium-oxide wall tile for use in a modular wall system includes a plurality of layers. The plurality of layers includes an inner core comprising magnesium-oxide and having a length and a height and a front face and a back face. The length and the height can in at least one implementation be greater than or equal to 40 inches. In at least one implementation, the plurality of layers also includes a thermofoil layer disposed over at least one face of the inner core. In at least one embodiment, the thermofoil layer extends over five sides/faces of the inner core.

In another aspect of the presently disclosed embodiments, a modular wall system includes a magnesium-oxide wall tile that has an inner core comprising magnesium-oxide, a thermofoil layer disposed over at least one side of the inner core, and an attachment protrusion affixed to a back face of the magnesium-oxide wall tile. The modular wall system also includes a vertical structural component, a horizontal structural component affixed to the vertical structural component, and a connection component configured to engage with the attachment protrusion of the magnesium-oxide wall tile. The connection component is positioned on the horizontal structural component for removably securing the magnesium-oxide wall tile to the horizontal structural component.

In yet another aspect of the presently disclosed embodiments, a method of forming a modular magnesium-oxide wall tile includes obtaining an inner core comprising a magnesium-oxide panel, cutting the magnesium-oxide panel to a desired length and height (in at least one example, the length and the height each exceed 40 inches), disposing an intermediate layer comprising a smooth resin-impregnated paper on the inner core, and thermoforming a thermofoil layer over at least one side of the inner core, wherein the thermofoil layer is thermoformed at least partially over the intermediate layer.

The implementations of MgO wall tiles for modular wall systems described herein solve a number of problems in the art, such as those noted above. In particular, one or more implementations of the MgO wall tiles described herein provide an MgO wall tile that provides the advantageous properties of MgO materials, such as fire, pest, moisture, mold, and/or mildew resistance, while avoiding the conventional, often undesirable, aesthetic appearance associated with MgO materials (e.g., a coarse, porous, rough aesthetic, often of undesirable color). For example, the outer thermofoil layer of at least some of the presently disclosed MgO wall tiles may provide a non-porous, smooth aesthetic that is capable of reflecting light (or providing a glossy, multi-colored surface) in a more desirable manner than conventional MgO products.

The outer thermofoil layer may also cause at least some of the presently disclosed MgO wall tiles to provide other advantages not commonly associated with MgO materials. For example, an end user can more easily clean at least some of the presently disclosed MgO wall tiles than conventional, porous MgO products, due to the non-porous nature of the thermofoil outer layer of the presently disclosed MgO wall tiles. Additionally, at least some of the presently disclosed MgO wall tiles provide improved durability as compared with conventional MgO products, in particular because of the thermofoil outer layer covering more than one side of the presently disclosed MgO wall tiles.

Accordingly, at least some of the presently disclosed MgO wall tiles are configured to withstand initial installation into a modular wall system as well as repeated reconfiguration and/or re-arrangement within the modular wall system without chipping, crumbling, or otherwise breaking apart. Accordingly, at least some of the presently disclosed MgO wall tiles are suitable for use in modular wall systems, whereas other MgO products are not suited for such use.

Those skilled in the art will recognize in view of the present disclosure that the terms "wall tile" and "wall panel" can, in some instances, be used interchangeably.

FIGS. 1A through 5 illustrate various conceptual representations, architectures, methods, examples, and supporting illustrations related to MgO wall tiles for modular wall systems. For example, FIGS. 1A and 1B illustrate examples of modular wall systems including a number of modular wall tiles. FIG. 1A illustrates modular wall system 100a, and FIG. 1B illustrates modular wall system 100b. Each of modular wall system 100a and 100b include a number of wall tiles 105 secured to vertical structural components 110 and/or horizontal structural components 120. The vertical structural components 110 and/or horizontal structural components 120 may be disposed between adjacent wall tiles 105 or along an edge of the modular wall systems 100a, 100b.

The various components of the modular wall systems 100a and 100b may be selectively attachable to one another to form a partitioning structure. For example, the horizontal structural components 120 and/or the vertical structural components 110 may include one or more fastening features for attaching to one another, and the horizontal structural components 120 (and/or the vertical structural components 110, in some instances) may include one or more attachment features for removably securing to one or more wall tiles 105 (e.g., clips, snaps, hooks, channels, etc.). In this regard, the modular wall systems 100a and 100b may provide a wall system that can be easily assembled, disassembled, rearranged, and/or reconfigured for non-permanent portioning of spaces, such as office spaces. Accordingly, manufacturers, builders, and/or designers may move and/or rearrange entire walls and/or remove, replace, and/or rearrange individual wall tiles 105 to create various customized spaces or aesthetic appearances.

Figure 1B:
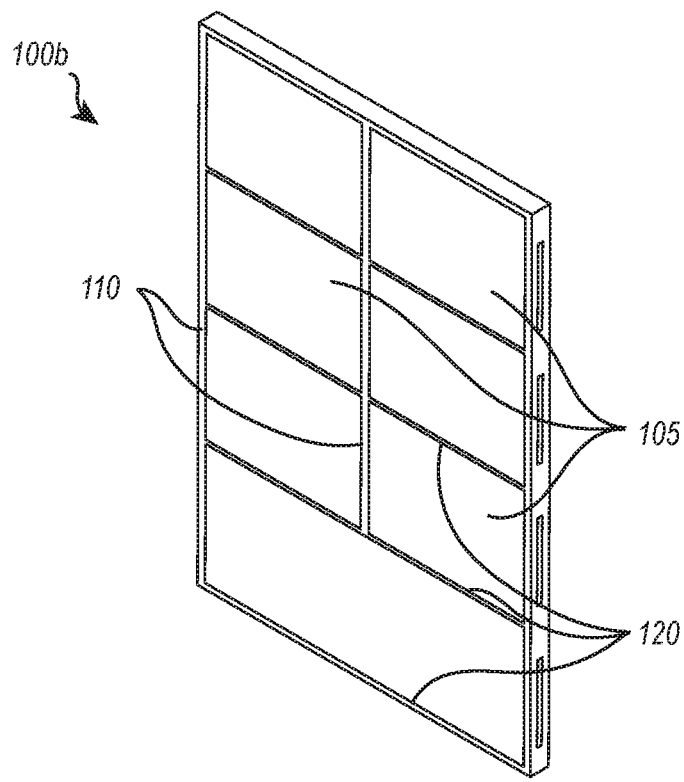
Figure 2A:
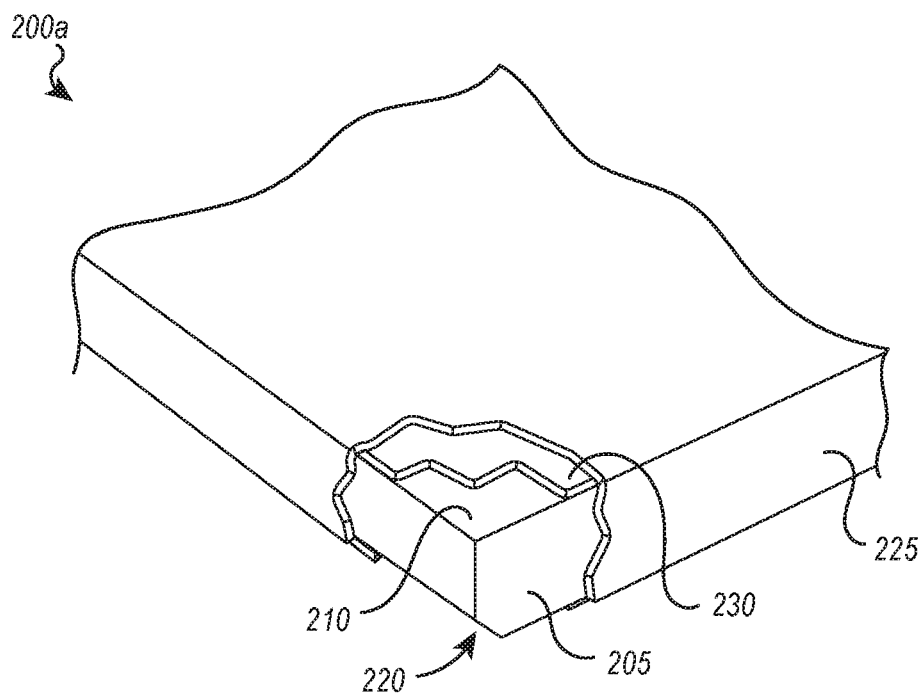
FIGS. 2A and 2B illustrate, respectively, top and bottom perspective views of an example embodiment of a magnesium-oxide (MgO) wall tile with portions of various layers cut away for illustrative purposes, in accordance with an embodiment of the present invention.
Figure 2B:
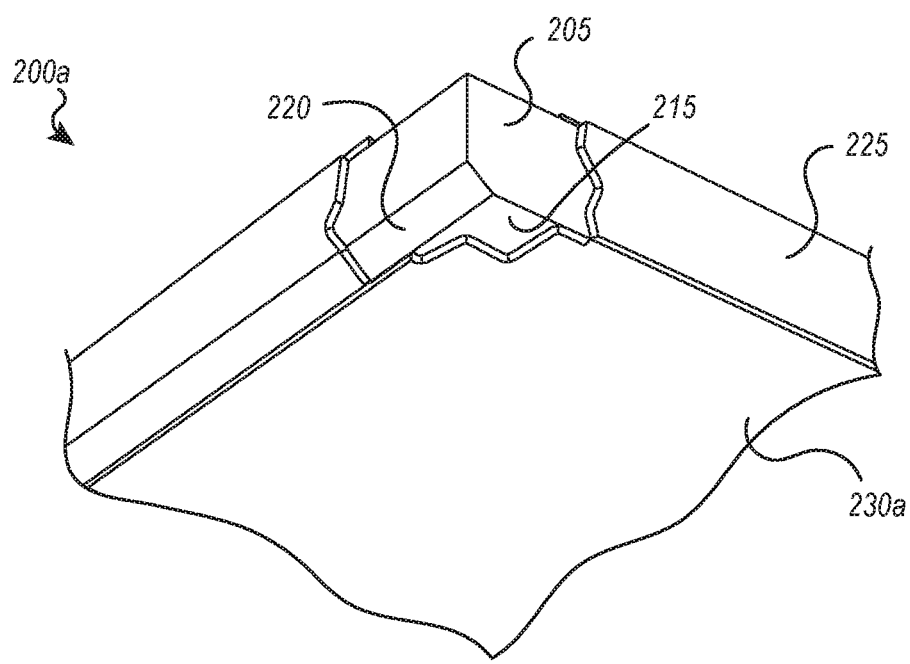

It will be appreciated from FIGS. 1A and 1B that modular wall systems may take on various forms and/or configurations. For instance, modular wall systems may include wall tiles (such as wall tiles 105), horizontal components, and/or vertical components that are implemented with different sizes and/or orientations FIGS. 2A and 2B illustrate, respectively, top and bottom perspective views of an example embodiment of an MgO wall tile 200a with portions of various layers cut away for illustrative purposes. As is evident from FIGS. 2A and 2B, in some embodiments, the MgO wall tile 200a includes multiple layers. For instance, MgO wall tile 200a includes an inner core 205. The inner core 205 is composed of a magnesium-oxide material., thereby allowing the MgO wall tile 200a to attain at least some of the benefits associated with MgO products (e.g., fire/heat resistance).

FIG. 2A further shows that the inner core 205 of the MgO wall tile 200a can include a front face 210 and a back face 215. In some instances, when the MgO wall tile 200a mounts to a modular wall system (e.g., modular wall system 100a, 100b), the front face 210 is directed outward from the modular wall structure (e.g., as demonstrated in FIGS. 1A and 1B), and the back face 215 opposes the front face 210. The inner core 205 shown in FIGS. 2A and 2B also includes a chamfered edge 220.

When an assembler, manufacturer, or end user removably affixes the MgO wall tile 200a to a connection component of a modular wall structure (e.g., connection component 410 of FIG. 4), a chamfered edge 220 of the MgO wall tile 200a may contact one or more corresponding angled surfaces of the connection component. Accordingly, the chamfered edge 220 may allow the MgO wall tile 200a to rest in an aligned configuration when the MgO wall tile 200a is connected to a connection component of a modular wall structure. Those skilled in the art will appreciate that an MgO wall tile 200a may include any number of chamfered edges (e.g., 2, 4) to align with any number of angled surfaces of any number of connection components.

The MgO wall tile 200a includes a thermofoil layer 225 disposed over at least the front face 210 of the MgO wall tile 200a. In FIGS. 2A and 2B, the thermofoil layer 225 also extends and is disposed at least partially over two edges of the inner core 205, the edges extending around the perimeter of the inner core 205 between the front face 210 and the back face 215 (or between the front face 210 and a chamfered edge 220). By extending over the front face 210 and at least partially over one or more edges of the inner core 205, the thermofoil layer 225 may operate, in some embodiments, to protect exterior portions of the MgO inner core 205 and to hold various portions of the MgO wall tile 200a together. Accordingly, in at least some embodiments, the thermofoil layer 225 enables the MgO wall tile 200a to withstand repeated handling without breaking apart, even after initial installation in a modular wall system, thereby rendering the MgO wall tile 200a usable in a reconfigurable modular wall system (e.g., modular wall systems 100a, 100b).

FIGS. 2A and 2B illustrate the thermofoil layer 225 extending over two edges of the inner core 205, but one will appreciate that the thermofoil layer may extend over any number of edges of the inner core 205 of the MgO wall tile 200a (e.g., 1, 3, or 4 edges).

Furthermore, as noted above, a thermofoil layer 225 may advantageously enable an MgO wall tile 200a to provide a pleasing and/or adaptable aesthetic, in contrast with the rough, coarse, and/or limited aesthetic commonly associated with MgO materials. For instance, a thermofoil layer 225 may provide a smooth outer surface for the MgO wall tile 200a that reflects light in a uniform, desirable manner, or otherwise provides a glossy, colorable surface. In particular, a thermofoil layer 225 may be implemented with various colors, textures, and/or other finishes (e.g., a paint layer or additional facing material) added thereto to complement diverse modular wall installation settings.

In addition to the foregoing, FIGS. 2A and 2B illustrate the thermofoil layer 225 fully extending over the front face 210, the edges, and the chamfered edge 220 of the inner core 205 (except for the portions that are cut away for illustrative purposes). One will recognize, however, that the thermofoil layer 225 need not extend fully over the aforementioned portions of the inner core 205 to provide the benefits described herein. By way of non-limiting example, in some implementations, the thermofoil layer 225 extends only over the edges of the inner core 205 without extending over the chamfered edge 220, and in yet other instances, the thermofoil layer 225 extends only over a portion of one or more edges and/or only over a portion of the chamfered edge 220 of the inner core 205.

In addition, those skilled in the art will recognize that although FIGS. 2A and 2B show that the thermofoil layer 225 does not extend over the back face 215 of the inner core 205, in some instances the thermofoil layer 225 may extend over any portion of the back face 215. For example, the thermofoil layer 225 may extend over the back face 215 to positions that are proximate to the interface between an edge of the inner core 205 and the back face 215. In other instances, an MgO wall tile 200a includes an additional thermofoil layer disposed over the back face 215 of the inner core 205.

FIGS. 2A and 2B depict the MgO wall tile 200a with break lines illustrated at some of the edges thereof. The break lines indicate that the MgO wall tile 200a shown in FIGS. 2A and 2B may be implemented as tiles of any length, height, or depth (e.g., the distance between the front face 210 and the back face 215). For example, because the thermofoil layer 225 may operate to hold the MgO material of the inner core 205 securely together, even through repeated handling, an MgO wall tile 200a may have a length and/or a height that is 40 inches or greater. In some examples, the length and the height of the MgO wall tile 200a are equal (e.g., approximately 46 inches in both length and height).

Whereas, in other examples the length and the height of the MgO wall tile 200a are unequal (e.g., 60 inches in length with up to 48 inches in height). Furthermore, as noted, an MgO wall tile 200a may include any suitable depth or thickness, such as, by way of non-limiting example, a depth or thickness within a range of ⅛ inch to 1 inch. In some implementations, an MgO wall tile 200a has a depth within a range of ¼ inch to ¾ inch, or, in more particular implementations, within a range of ½ inch to ⅝ inch.

FIG. 2A further shows an embodiment in which the MgO wall tile 200a also includes an intermediate layer 230 disposed on the inner core 205 and positioned between the thermofoil layer 225 and the front face 210 of the inner core 205. The intermediate layer 230 can further serve to strengthen the MgO wall tile 200a against forces that are incident to the repeated handling associated with wall tiles in modular wall systems (e.g., modular wall system 100a, 100b). Furthermore, in some instances, disposing an intermediate layer 230 on the inner core 205 between the inner core 205 and the thermofoil layer 225 can operate to improve the finish quality of an MgO wall tile (e.g., as compared with MgO wall tiles that do not include an intermediate layer 230 between the inner core 205 and the thermofoil layer 225).

The intermediate layer 230 may be laminated onto the inner core 205 or adhered thereto in any suitable manner known in the art. Those skilled in the art will recognize that the intermediate layer 230 may take on various forms in various implementations. In some implementations, the intermediate layer 230 is a veneer comprising a paper or wood product, such as a resin-impregnated paper or wood fiber veneer (e.g., LUXCELL®, GATOR-PLY®). The intermediate layer 230 may additionally, or alternatively, include any other types and/or combinations of facing/backing materials, such as thin-gauge sheet metal (e.g., steel), to further fortify the MgO wall tile 200a.

In the embodiment shown in FIG. 2B, the intermediate layer 230 of the MgO wall tile 200a also includes a complementary portion 230a positioned on the back face 215 of the inner core 205 of the MgO wall tile 200a. Although FIG. 2B depicts the complementary portion 230a of the intermediate layer 230 as extending fully over the back face 215 of the inner core 205 (except for the portion that is cut away for illustrative purposes), those skilled in the art will appreciate that the complementary portion 230a may further extend over any edge (and/or chamfered edge 220) of the MgO wall tile and/or over less than the entire back face 215 of the inner core 205. In some instances, the MgO wall tile 200a only includes an intermediate layer disposed over the back face 215 of the inner core 205, without an intermediate layer disposed over the front face 210.

Furthermore, although FIG. 2B illustrates that the thermofoil layer 225 does not extend over the complementary portion 230a of the intermediate layer 230 on the back face 215 of the inner core 205, one will recognize that, in some embodiments, the thermofoil layer 225 is at least partially disposed over the complementary portion 230a (e.g., extending over the complementary portion 230a to positions over the back face 215 that are proximate to the interface between an edge of the inner core 205 and the back face 215).

Those skilled in the art will recognize that the MgO wall tile 200a embodiment(s) depicted in FIGS. 2A and 2B are illustrative only and non-limiting and that other variations are within the scope of this disclosure. For example, FIGS. 3A and 3B illustrate, respectively, top and bottom perspective views of another example embodiment of an MgO wall tile 200b with a portion of the thermofoil layer 225 cut away for illustrative purposes.

Figure 3A:
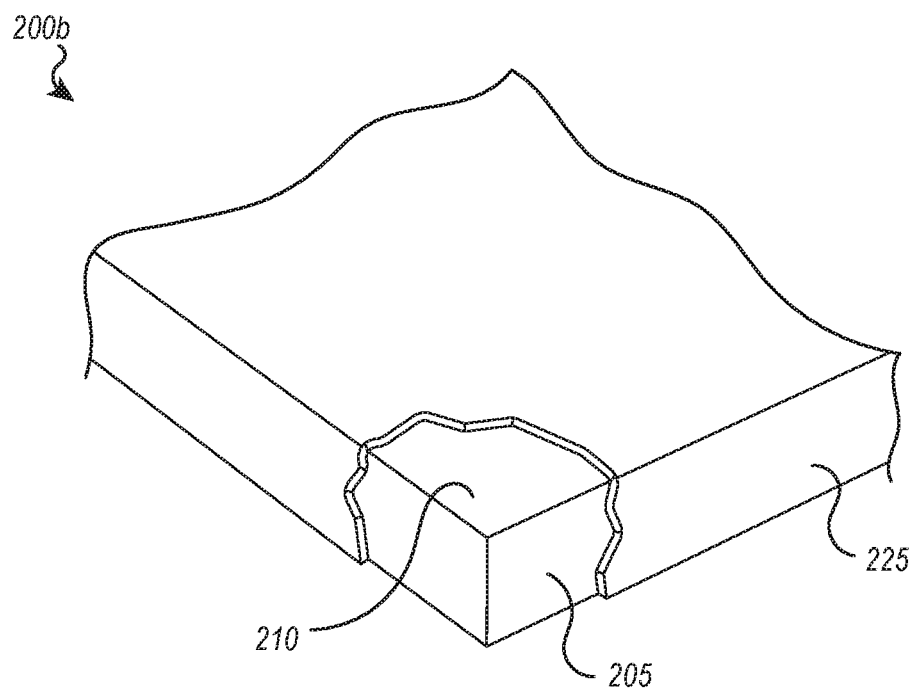
FIGS. 3A and 3B illustrate, respectively, top and bottom perspective views of another example embodiment of an MgO wall tile with a portion of a layer cut away for illustrative purposes, in accordance with an embodiment of the present invention.
Figure 3B:
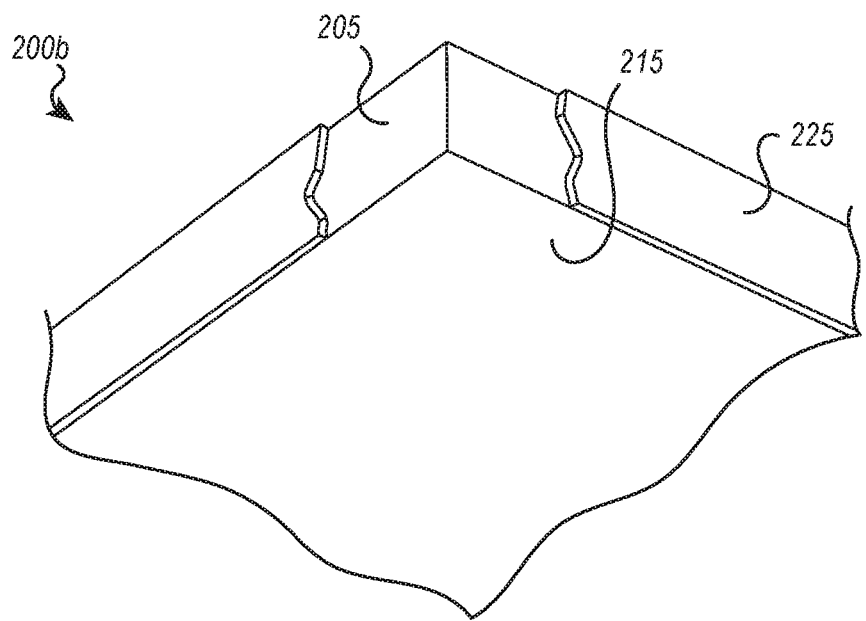

As is evident in FIGS. 3A and 3B, the depicted MgO wall tile 200b embodiment includes a magnesium oxide inner core 205 and a thermofoil layer 225 disposed over the front face 210 of the inner core 205 and over the edges (e.g., 4 of the edges) of the inner core 205. FIGS. 3A and 3B also illustrate that the depicted MgO wall tile 200b embodiment omits a chamfered edge (e.g., chamfered edge 220 shown in FIGS. 2A and 2B) and an intermediate layer (e.g., intermediate layer 230 and complementary portion 230a shown in FIGS. 2A and 2B).

In view of the foregoing, those skilled in the art will recognize that the presently disclosed MgO wall tiles may include a thermofoil layer disposed over a magnesium oxide inner core and any number of intermediate layers disposed at least partially over the front face, back face, and/or edges of the magnesium oxide inner core (e.g., between the inner core and the thermofoil layer).

The presently disclosed MgO wall tiles may also include one or more attachment protrusions for securing the MgO wall tiles to connection components of modular wall systems. In particular, an installer may secure attachment protrusions of MgO wall tiles to connection components of modular wall systems in a removable fashion, thus allowing the presently disclosed MgO wall tiles to be versatilely re-arranged within the modular wall systems.

Figure 4:
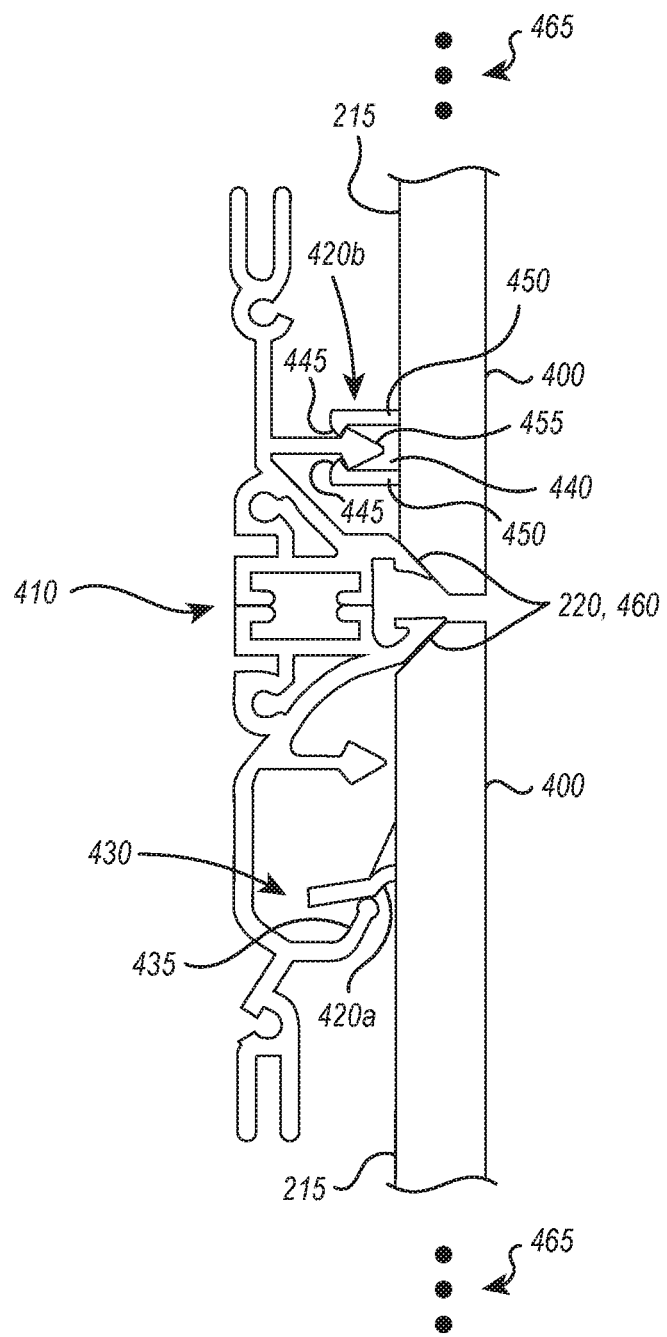
FIG. 4 illustrates an example embodiment of a connection component that removably secures MgO wall tiles, in accordance with an embodiment of the present invention.

Along these lines, FIG. 4 illustrates an example embodiment of a connection component 410 of a modular wall system (e.g., of modular wall system 100a, 100b) that removably secures MgO wall tiles 400. For example, the connection component 410 illustrated in FIG. 4 may correspond to a connection component in modular wall system 100a and/or 100b that is connected to or integrally formed as part of a horizontal or vertical structural component of the modular wall system 100a and/or 100b. The MgO wall tiles 400 shown in FIG. 4 may correspond to or at least slightly vary from the MgO wall tiles 200a and 200b shown and described hereinabove with reference to FIGS. 2A-3B, and FIG. 4 omits details of the layers of the MgO wall tiles 400 for clarity.

FIG. 4 shows that the MgO wall tiles 400 may include attachment protrusions 420a, 420b. The illustrated attachment protrusions 420a, 420b are secured to the back face 215 of the MgO wall tiles 400 in any suitable manner known in the art (e.g., with self-tapping screws, adhesives, etc.).

Furthermore, the attachment protrusions 420a, 420b are configured to engage with various portions of the connection component 410 to facilitate removable securement to the connection component 410. For instance, in some embodiments, the attachment protrusion 420a constitutes a clip that is configured to insert into and reside within a cavity 430 of the connection component 410. The attachment protrusion 420a implemented as a clip can therefore hold the MgO wall tile 400 to the connection component 410.

FIG. 4 shows that the attachment protrusion 420a can extend away from the back face 215 of the MgO wall tile 400 in a non-parallel fashion (e.g., tilted downward) to interface with and rest over a ledge 435 of the cavity 430 of the connection component. This can allow the MgO wall tile 400 to removably hang in place with respect to the connection component 410. Furthermore, in at least one embodiment, the attachment protrusion 420b includes a channel 440 with one or more channel protrusions 445 protruding inward from sidewalls 450 that define the channel 440.

As shown, the channel protrusion(s) 445 are configured to engage with an engagement protrusion 455 of the connection component 410 (e.g., via a snap-fit) that resides within the channel 440 when the channel protrusion(s) 445 are removably engaged with the engagement protrusion 455 of the connection component 410. In this regard, the attachment protrusions 420a, 420b of the MgO wall tiles 400 may enable the MgO wall tiles to removably affix to connection components of structural components (e.g., horizontal structural components 120, vertical structural components 110) of modular wall systems (e.g., modular wall systems 100a, 100b). Other methods of attachment could include grooved recesses (not shown) for hanging over a reciprocally grooved recess (also not shown).

A modular wall system in accordance with the present invention can include any number MgO wall tiles 400 that are adjacently arranged to complete a wall structure (e.g., arranged in a vertically adjacent and/or a horizontally adjacent manner). Thus, as shown in the embodiment depicted in FIG. 4, the connection component 410 includes both a cavity 430 to removably engage with attachment protrusions such as attachment protrusion 420a and an engagement protrusion 455 to engage with attachment protrusions such as attachment protrusion 420b (one will note that a connection component may be composed of any number of constituent parts). As noted hereinabove, connection component 410 also includes angled surfaces 460 for interfacing with chamfered edges 220 (described hereinabove with reference to FIGS. 2A and 2B) to align the MgO wall tiles 400 in a desired adjacent arrangement. In this regard, connection component 410 is configured to engage with attachment protrusions of different adjacently arranged MgO wall tiles 400 as part of a modular wall system (e.g., modular wall system 100a, 100b).

It should be noted that FIG. 4 only shows portions of MgO wall tiles 400 (e.g., a bottom portion of one MgO wall tile 400 with attachment protrusion 420b attached thereon and a top portion of another MgO wall tile 400 with attachment protrusion 420a attached thereon). FIG. 4 also shows that remaining portions of the MgO wall tiles 400, as well as other MgO wall tiles 400 and/or connection components 410 are represented in FIG. 4 in a simplified manner by ellipses 465. In view of the foregoing, one will recognize that a modular wall system (e.g., modular wall systems 100a, 100b) may include any number of MgO wall tiles 400 and/or connection components 410 for receiving MgO wall tiles 400.

One will also recognize, in view of the present specification and claims, that a single MgO wall tile 400 can include a top portion as shown in FIG. 4 (e.g., with attachment protrusion 420a attached thereon) and a bottom portion as shown in FIG. 4 (e.g., with attachment protrusion 420b attached thereon). Accordingly, in some implementations, an MgO wall tile 400 includes two or more attachment protrusions (e.g., both attachment protrusions 420a and 420b) extending from the back face 215 thereof, with each attachment protrusion being configured to removably secure to a different connection component 410 in a modular wall system (e.g., modular wall system 100a, 100b). This can include connection components 410 that are vertically (or horizontally) offset from one another, and/or connected to or integrally formed as different horizontal structural components 120 (or vertical structural components 110).

Figure 5:
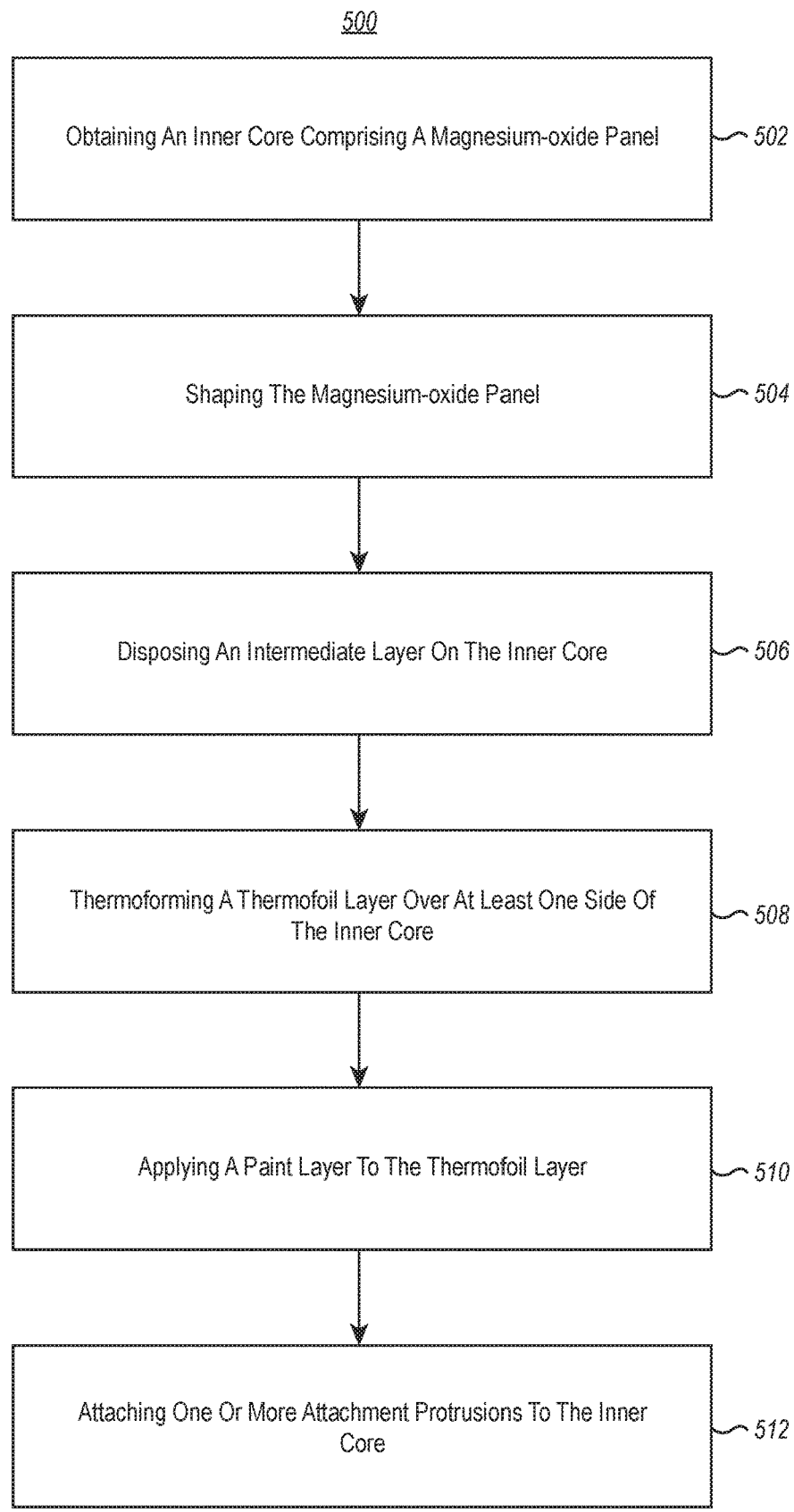
FIG. 5 illustrates an example flow diagram depicting method acts associated with forming an MgO wall tile, in accordance with an embodiment of the present invention.

The present invention can also be described in terms of acts in a method for accomplishing a particular result. Along these lines, FIG. 5 illustrates an example flow diagram 500 depicting method acts associated with forming an MgO wall tile. Although the steps shown in the flow diagram may be illustrated or discussed in a certain order, no particular ordering is required unless specifically stated, or required because an act is dependent on another act being completed prior to the act being performed. Furthermore, it should be noted that not all steps represented in flow diagram 500 are essential for forming an MgO wall tile as presently disclosed. The steps and acts of FIG. 5 are described below with reference to the systems, components, and structures of FIGS. 1-4. For instance, reference numerals included parenthetically hereinbelow refer, by way of illustrative example, to systems, components, structures, and elements described hereinabove with reference to FIGS. 1-4.

Flow diagram 500 depicts acts of obtaining an inner core comprising a magnesium-oxide panel (act 502), shaping the magnesium-oxide panel (act 504), disposing an intermediate layer on the inner core (act 506), thermoforming a thermofoil layer over at least one side of the inner core (act 508), applying a paint layer to the thermofoil layer (act 510), and attaching one or more attachment protrusions to the inner core (act 512).

As noted above, act 502 includes obtaining an inner core comprising an MgO panel (e.g., inner core 205). As noted above, MgO panels may provide benefits such as fire/pest/mold resistance but may provide an undesirable aesthetic and may tend to chip and/or break apart when handled excessively. Accordingly, conventional MgO panels are not suitable for modular wall systems, necessitating additional acts/procedures to form an MgO wall tile that is suitable for the repeated handling and aesthetic demands associated with modular wall systems (e.g., modular wall systems 100a, 100b).

Act 504 includes shaping the MgO panel. Manufacturers, designers, builders, and/or other users may obtain MgO panels from providers in panels of various sizes (e.g., in 4-foot by 8-foot sheets, with a depth or thickness within a range of ¼ inch to ¾ inch), and the sizes provided may differ from the size of intended implementation into a modular wall system. Accordingly, a manufacturer, designer, builder, and/or other user may need to shape the MgO panel into a desired size for implementation as an inner core (205) of an MgO wall tile (200a, 200b) in a modular wall system (100a, 100b).

An MgO panel may be cut/shaped utilizing any suitable procedure known in the art. By way of non-limiting example, in some instances, a manufacturer, designer, builder, and/or other user initially saws the MgO panel down to a size that is larger than the desired final size (e.g., leaving an additional portion of MgO material around the perimeter of the sawed panel, such as 5 mm of extra MgO material per side of the MgO panel) and then performs a cutting operation (e.g., with a mill) to bring the MgO panel down to the desired final size for use as an inner core (205) of an MgO wall tile (200a, 200b), as described hereinabove.

In some embodiments, the desired final size of an MgO panel for use as an inner core (205) of an MgO wall tile (200a, 200b) is greater than 40 inches in both length and height. By way of non-limiting example, an MgO inner core (205) may be 60 inches in length with a height of up to 48 inches. In other instances, the desired final size is 1,167.9 mm in both length and height. In some instances, large final sizes for the MgO panels of the presently disclosed MgO wall tiles (200a, 200b) are made possible by a thermofoil layer (225) that operates to fortify the MgO wall tiles (200a, 200b), as described herein.

It should also be noted that, in some instances, MgO panels include buildups of UV filler that a manufacturer, designer, builder, and/or other user may need to sand out (e.g., with 320p grit sand paper on an orbital sander) before proceeding with other acts associated with forming an MgO wall tile for use in a modular wall system, as described herein.

Act 506 includes disposing an intermediate layer (230) on the inner core (205). The intermediate layer (230) may include, as described hereinabove, any type of facing/backing materials, such as a resin-impregnated paper or wood fiber veneer, thin-gauged metals, and/or combinations thereof. The intermediate layer (230) may become disposed over any portion of the front face (210) of the MgO inner core (205), the back face thereof (215), or both. In addition, the intermediate layer (230) may extend over any edges or chamfered edges (220) of the MgO inner core (205). Those skilled in the art will appreciate, in view of the present disclosure, that act 506 may be omitted, in some embodiments, from a method for forming an MgO wall tile (200a, 200b) for a modular wall system (100a, 100b). For instance, the embodiments depicted in FIGS. 3A and 3B do not include intermediate layers (230). Furthermore, it should be noted that an MgO panel may already include an intermediate layer (230) disposed thereon before performing the shaping process described above (act 504).

Act 508 includes thermoforming a thermofoil layer (225) over at least one side of the inner core (205). In some implementations, the thermofoil layer (225) becomes thermoformed over a front face (210) of the MgO inner core (205) and over each edge of the MgO inner core (205) (e.g., over 5 sides of the MgO inner core, including the front face and four edges). The thermofoil layer (225) may operate to give the MgO wall tile (200a, 200b) a desirable and/or adaptable aesthetic appearance while serving to hold the MgO material together to withstand repeated reconfiguring within a modular wall system (e.g., modular wall system 100a, 100b).

Thermoforming the thermofoil layer (225) over the MgO inner core (205) may entail multiple sub-processes. For instance, a user may apply an adhesive (e.g., DUABOND 6477M3 BLUE, DUABOND 6429B, and/or any other adhesive suitable for thermoforming known in the art) to the MgO inner core (205) (and/or intermediate layer (230), where present) in preparation for thermoforming the thermofoil layer (225) onto the MgO inner core. A user may apply the adhesive (e.g., by spraying) after taking sufficient preparatory steps (e.g., wiping and/or tacking) to remove contaminants, dust, etc., to prepare the MgO inner core (205) and/or intermediate layer (230) to receive the adhesive. A user may subsequently allow excess adhesive to flash off of the MgO inner core (205) and/or intermediate layer (230) before placing the components onto a thermofoil application line (e.g., a thermofoil press).

A user may operate a thermofoil press to thermoform the thermofoil layer (225) onto the MgO wall tile (200a, 200b) with various temperature and/or pressure settings for various time intervals. By way of illustrative, non-limiting example, in some implementations, a thermofoil press operates to thermoform a high gloss thermofoil layer (for aesthetic reflectivity) onto an MgO wall tile (200a, 200b) with a heating top temperature within a range of 115° C. to 120° C. (e.g., 117° C.), a membrane temperature controlled within a range of 90° C. to 95° C. and with a top pressure within a range of 5 to 7 bar (e.g., 6 bar), multi-frame pressure within a range of 2 to 4 bar (e.g., 3 bar), and with hydraulic pressure within a range of 45 to 55 bar (e.g., 50 or 53 bar). The thermofoil press may allocate, approximately and illustratively, 4 seconds to pre-blowing, 20 seconds to pre-heating, 15 seconds to pressing, and 20 seconds to cooling. Other variations and parameters for operating a thermofoil press to dispose a thermofoil layer (225) onto and MgO wall tile (200a, 200b) are within the scope of this disclosure.

A user may trim excess thermofoil after performing the thermoforming process with a thermofoil press (e.g., to remove portions of the thermofoil layer that are not affixed to the MgO inner core and/or intermediate layer). In some implementations, a user may perform more than one thermoforming step to form an MgO wall tile (200a, 200b) for a modular wall system (e.g., to dispose an additional thermofoil layer (225) onto a back face (215) of the MgO wall tile (200a, 200b)).

Act 510, which those skilled in the art will recognize as an optional step, includes applying a paint layer to the thermofoil layer (225). Adding a paint layer (or other texturing layer) to the thermofoil layer (225) of an MgO wall tile (200a, 200b) may add to the aesthetic adaptability of the presently disclosed MgO wall tile (200a, 200b), allowing the MgO wall tile to accommodate various installation sites by receiving different paints/texturing that may complement one or more existing features/themes within the installation site.

Act 512 includes attaching one or more attachment protrusions (420a, 420b) to the inner core (205). The attachment protrusion(s) may take on various forms, such as a clip form (e.g., similar to attachment protrusion 420a described hereinabove with reference to FIG. 4) and/or a channel form (e.g., similar to attachment protrusion 420b described hereinabove with reference to FIG. 4). In some instances, an MgO wall tile (200a, 200b) receives a single attachment protrusion (420a, 420b), whereas, in other instances, the MgO wall tile (200a, 200b) receives two or more attachment protrusions (420a, 420b), with at least two of the attachment protrusions taking on different forms.

The attachment protrusion(s) (420a, 420b) that become attached to form the MgO wall tile (200a, 200b) may enable the MgO wall tile (420a, 420b) to removably secure to one or more connection components (410) of one or more structural components of a modular wall system (e.g., horizontal or vertical structural components 120, 110 of a modular wall system 100a, 100b), allowing the MgO wall tile (200a, 200b) to be selectively removable from the modular wall system (100a, 100b) after initial installation onto the modular wall system (100a, 100b) without chipping or breaking away of the MgO material of the MgO wall tile (200a, 200b), thereby allowing for adaptive reconfiguration of the modular wall system with MgO wall tiles (200a, 200b) while still providing the practical benefits associated with MgO materials (e.g., fire resistance).

In view of the present disclosure, those skilled in the art will understand the terms "modular," "modular wall," "modular wall tile," and/or "modular wall system," as used herein, to broadly refer to features, elements, structures, and/or aspects of any pre-prepared or prefabricated wall installation schema, system, and/or method, regardless of whether post-installation wall reconfiguration or rearrangement is contemplated by the particular wall installation schema, system, and/or method. By way of non-limiting example, one will appreciate in view of the present disclosure that at least some aspects of the presently disclosed MgO wall tiles are implementable into prefabricated wall systems that are not intended for wall reconfiguration and/or reinstallation after initial installation.

The present invention may be embodied in other specific forms without departing from its spirit or essential characteristics. The described embodiments are to be considered in all respects only as illustrative and not restrictive. The scope of the invention is, therefore, indicated by the appended claims rather than by the foregoing description. All changes that come within the meaning and range of equivalency of the claims are to be embraced within their scope.

Various alterations and/or modifications of the inventive features illustrated herein, and additional applications of the principles illustrated herein, which would occur to one skilled in the relevant art and having possession of this disclosure, can be made to the illustrated embodiments without departing from the spirit and scope of the invention as defined by the claims, and are to be considered within the scope of this disclosure. Thus, while various aspects and embodiments have been disclosed herein, other aspects and embodiments are contemplated. While a number of methods and components similar or equivalent to those described herein can be used to practice embodiments of the present disclosure, only certain components and methods are described herein.

It will also be appreciated that systems, devices, products, kits, methods, and/or processes, according to certain embodiments of the present disclosure may include, incorporate, or otherwise comprise properties, features (e.g., components, members, elements, parts, and/or portions) described in other embodiments disclosed and/or described herein. Accordingly, the various features of certain embodiments can be compatible with, combined with, included in, and/or incorporated into other embodiments of the present disclosure. Thus, disclosure of certain features relative to a specific embodiment of the present disclosure should not be construed as limiting application or inclusion of said features to the specific embodiment. Rather, it will be appreciated that other embodiments can also include said features, members, elements, parts, and/or portions without necessarily departing from the scope of the present disclosure.

For example, aspects of the present invention can be alternatively described as follows:
1. magnesium-oxide wall tile for use in a modular wall system, comprising:
    a plurality of layers, comprising:
        an inner core comprising magnesium-oxide and having a length and a height and a front face and a back face, wherein the length and the height are greater than or equal to 40 inches; and
        a thermofoil layer disposed over at least one face of the inner core.
2. The magnesium-oxide wall tile of claim 1, further comprising an intermediate layer disposed on the inner core.
3. The magnesium-oxide wall tile of claim 2, wherein the intermediate layer is disposed between the inner core and the thermofoil layer.
4. The magnesium-oxide wall tile of claim 2, wherein the intermediate layer is disposed on the back face of the magnesium-oxide wall tile.
5. The magnesium-oxide wall tile of claim 4, wherein the thermofoil layer is at least partially disposed over the back face of the magnesium-oxide wall tile.
6. The magnesium-oxide wall tile of claim 2, wherein the intermediate layer comprises a resin impregnated paper product.
7. The magnesium-oxide wall tile of claim 1, wherein the thermofoil layer is disposed over the front face and at least partially over four edges of the inner core.
8. The magnesium-oxide wall tile of claim 1, further comprising at least one attachment protrusion secured to the back face of the magnesium-oxide wall tile for attaching the magnesium-oxide wall tile to a connection component of a modular wall system.
9. The magnesium-oxide wall tile of claim 1, further comprising a paint layer disposed over the thermofoil layer.
10. A modular wall system, comprising:
    a magnesium-oxide wall tile comprising:
    an inner core comprising magnesium-oxide;
    a thermofoil layer disposed over at least one side of the inner core; and
    an attachment protrusion affixed to a back face of the magnesium-oxide wall tile;
    a vertical structural component;
    a horizontal structural component affixed to the vertical structural component; and
    a connection component configured to engage with the attachment protrusion of the magnesium-oxide wall tile, wherein:
    the connection component is positioned on the horizontal structural component for removably securing the magnesium-oxide wall tile to the horizontal structural component.
11. The modular wall system of claim 10, wherein:
    the connection component includes a cavity sized and shaped to receive at least a portion of the attachment protrusion of the magnesium-oxide wall tile; and
    the attachment protrusion is configured to insert into the cavity to removably hang the magnesium-oxide wall tile on the horizontal structural component.
12. The modular wall system of claim 10, wherein:
    the attachment protrusion of the magnesium-oxide wall tile includes a channel with an inward protrusion protruding inward toward an interior of the channel; and
    the connection component includes an engagement protrusion configured to engage with the inward protrusion of the attachment protrusion and at least partially reside within the channel of the attachment protrusion to removably secure the magnesium-oxide wall tile to the horizontal structural component.
13. The modular wall system of claim 10, further comprising:
    a plurality of magnesium-oxide wall tiles;
    wherein the connection component is configured to engage with the attachment protrusions of each of the plurality of magnesium-oxide wall tiles.

14. The modular wall system of claim 10, further comprising:
a plurality of horizontal structural components, each horizontal structural component comprising a connection component.

15. The modular wall system of claim 14, wherein:
the magnesium-oxide wall tile includes a plurality of attachment protrusions;
each connection component of the plurality of horizontal structural components is configured to engage with different attachment protrusions of the plurality of attachment protrusions of the magnesium-oxide wall tile.

16. A method of forming a modular magnesium-oxide wall tile, comprising:
obtaining an inner core comprising a magnesium-oxide panel;
cutting the magnesium-oxide panel to a desired length and height, wherein the length and the height each exceed 40 inches;
disposing an intermediate layer comprising a smooth resin-impregnated paper on the inner core; and
thermoforming a thermofoil layer over at least one side of the inner core, wherein the thermofoil layer is thermoformed at least partially over the intermediate layer.

17. The method of claim 16, wherein the intermediate layer is disposed on a front face of the inner core.

18. The method of claim 16, wherein the thermofoil layer is thermoformed over at least five sides of the inner core.

19. The method of claim 16, further comprising attaching one or more attachment protrusions to a back face of the inner core.

20. The method of claim 16, further comprising applying a paint layer to the thermofoil layer.

Moreover, unless a feature is described as requiring another feature in combination therewith, any feature herein may be combined with any other feature of a same or different embodiment disclosed herein. Furthermore, various well-known aspects of illustrative systems, methods, apparatus, and the like are not described herein in particular detail in order to avoid obscuring aspects of the example embodiments. Such aspects are, however, also contemplated herein.

The present disclosure may be embodied in other specific forms without departing from its spirit or essential characteristics. The described embodiments are to be considered in all respects only as illustrative and not restrictive. The scope of the invention is, therefore, indicated by the appended claims rather than by the foregoing description. While certain embodiments and details have been included herein and in the attached disclosure for purposes of illustrating embodiments of the present disclosure, it will be apparent to those skilled in the art that various changes in the methods, products, devices, and apparatus disclosed herein may be made without departing from the scope of the disclosure or of the invention, which is defined in the appended claims. All changes which come within the meaning and range of equivalency of the claims are to be embraced within their scope.

We claim:

1. A magnesium-oxide wall tile for use in a prefabricated wall system, comprising:
a plurality of layers, comprising:
an inner core comprising magnesium-oxide and having a length and a height and a front face and a back face, the inner core comprising four edges, wherein at least two of the four edges of the inner core include a chamfer extending from the back face, configured to align the magnesium-oxide wall tile to the prefabricated wall system;
an intermediate layer disposed on the inner core;
a thermofoil layer disposed over the front face and the four edges of the inner core, wherein the thermofoil layer does not extend over the back face of the inner core; and
an attachment protrusion affixed to a back face of the magnesium-oxide wall tile, wherein the attachment protrusion is positioned at a top portion of the magnesium-oxide wall tile and extends away from the back face in a non-parallel direction.

2. The magnesium-oxide wall tile of claim 1, wherein the length and the height are greater than or equal to 40 inches.

3. The magnesium-oxide wall tile of claim 1, wherein the intermediate layer is disposed between the inner core and the thermofoil layer.

4. The magnesium-oxide wall tile of claim 1, wherein the intermediate layer is disposed on the back face of the magnesium-oxide wall tile.

5. The magnesium-oxide wall tile of claim 1, wherein the intermediate layer comprises a resin impregnated paper product.

6. The magnesium-oxide wall tile of claim 1, wherein the thermofoil layer is disposed over the front face and at least partially over four edges of the inner core.

7. The magnesium-oxide wall tile of claim 1, further comprising at least one attachment protrusion secured to the back face of the magnesium-oxide wall tile for attaching the magnesium-oxide wall tile to a connection component of the prefabricated wall system.

8. The magnesium-oxide wall tile of claim 1, further comprising a paint layer disposed over the thermofoil layer.

9. The magnesium-oxide wall tile of claim 1, wherein the inner core comprising magnesium-oxide is shaped into a desired size for implementation as an inner core in the pre-fabricated wall system.

10. The magnesium-oxide wall tile of claim 1, wherein the inner core comprising magnesium-oxide is shaped into a desired size for implementation as an inner core in the pre-fabricated wall system.

11. The magnesium-oxide wall tile of claim 1, wherein the inner core comprising magnesium-oxide is shaped for implementation in the pre-fabricated wall system.

12. A prefabricated wall system, comprising:
a magnesium-oxide wall tile comprising:
an inner core comprising magnesium-oxide, the inner core comprising at least two edges, wherein each of the at least two edges includes a chamfer;
a thermofoil layer disposed over at least one side of the inner core; and
an attachment protrusion affixed to a back face of the magnesium-oxide wall tile, wherein the attachment protrusion is positioned at a top portion of the magnesium-oxide wall tile and extends away from the back face in a non-parallel direction;
a vertical structural component;
a horizontal structural component affixed to the vertical structural component; and
a connection component configured to engage with the attachment protrusion of the magnesium-oxide wall tile, wherein:
the connection component is positioned on the horizontal structural component for removably hanging of the magnesium-oxide wall tile to the horizontal structural component; and the connection component comprises a corresponding angled surface to contact the chamfer of one of the at least two edges, wherein the corresponding angled surface aligns the magnesium-oxide wall tile to the prefabricated wall system.

13. The prefabricated wall system of claim 12, wherein:
the connection component includes a cavity sized and shaped to receive at least a portion of the attachment protrusion of the magnesium-oxide wall tile; and
the attachment protrusion is configured to insert into the cavity to removably hang the magnesium-oxide wall tile on the horizontal structural component.

14. The prefabricated wall system of claim 12, wherein:
the attachment protrusion is a first attachment protrusion and the magnesium-oxide wall tile comprises a second attachment protrusion that includes a channel with an inward protrusion protruding inward toward an interior of the channel; and
the connection component includes an engagement protrusion configured to engage with the inward protrusion of the attachment protrusion and at least partially reside within the channel of the attachment protrusion to removably secure the magnesium-oxide wall tile to the horizontal structural component.

15. The prefabricated wall system of claim 14, wherein the second attachment protrusion is positioned at a bottom portion of the back face of the magnesium-oxide wall tile.

16. The prefabricated wall system of claim 12, further comprising:
a plurality of magnesium-oxide wall tiles;
wherein the connection component is configured to engage with the attachment protrusions of each of the plurality of magnesium-oxide wall tiles.

17. The prefabricated wall system of claim 12, further comprising:
a plurality of horizontal structural components, each horizontal structural component comprising a connection component.

18. The prefabricated wall system of claim 17, wherein:
the magnesium-oxide wall tile includes a plurality of attachment protrusions;
each connection component of the plurality of horizontal structural components is configured to engage with different attachment protrusions of the plurality of attachment protrusions of the magnesium-oxide wall tile.

19. The magnesium-oxide wall tile of claim 1, wherein the intermediate layer comprises a metal product.

20. The magnesium-oxide wall tile of claim 1, wherein the intermediate layer comprises both a metal product and a resin-impregnated paper product.

21. The magnesium-oxide wall tile of claim 1, wherein the attachment protrusion is a first attachment protrusion, and the magnesium-oxide wall tile comprises a second attachment protrusion position at a bottom portion of the magnesium-oxide wall tile.

22. The magnesium-oxide wall tile of claim 21, wherein the second attachment protrusion of the magnesium-oxide wall tile includes a channel defined by two channel walls, each of the two channels comprising an inward protrusion protruding inward toward an interior of the channel.

* * * * *